United States Patent Office 3,287,297
Patented Nov. 22, 1966

3,287,297
COATING COMPOSITIONS COMPRISING VINYL CHLORIDE POLYMERS AND DRYING OIL ACID ESTERS OF LIQUID POLYEPOXIDES
Hans Anselm, Grafelfing, Peter Ludwig, Deisenhofen, and Walter Keil, Munich, Germany, assignors to Consortium für Elecktrochemische Industrie G.m.b.H., Munich, Germany
No Drawing. Filed July 27, 1962, Ser. No. 213,030
Claims priority, application Germany, Aug. 4, 1961,
C 24,800
1 Claim. (Cl. 260—23)

The present invention relates to an improved coating composition and process for the coating of metals therewith.

Coatings which are produced from plastisols or organosols of vinyl chloride polymers under conditions causing gelation are soft and adhere poorly to smooth surfaces. As a consequence, it has been proposed to mix vinyl chloride polymers with poly epoxides, plasticizers, diluents and curing agents and to harden coatings produced therefrom by heating to about 150–200° C. Such mixtures have the disadvantage that they only can be processed for a very short period as the reaction between the epoxide and the curing agent, which initiates below the gelation temperature of the vinyl chloride polymer, leads to thickening of the mass.

Suggestions to add the curing agent only shortly before use or to employ curing agents insoluble in the mixture at normal temperatures but soluble therein and therefore active at higher temperatures were not considered satisfactory from the viewpoint of the processor. They did not solve the problem of providing hardenable and homogeneous pastes from vinyl chloride polymers which are ready for use but which retain their homogeneity and processability by painting, spraying, dipping and the like at normal ambient temperatures.

According to the invention it was found that hardenable and homogeneous pastes ready for use but which are substantially stable at normal ambient temperatures can be produced from mixtures of vinyl chloride polymers with esters produced from epoxides and self drying fatty acids. Such pastes while being stable at normal ambient temperatures can after application as a coating to metal surfaces be hardened by heating in the presence of molecular oxygen to temperatures of 80–250° C. for a sufficient period of time. Preferably, temperatures between 160 and 200° C. are used for such hardening.

The vinyl chloride polymers which can be employed can be polyvinyl chloride (PVC) or copolymers of vinyl chloride with up to 50% by weight of vinyl acetate. They should have the recognized properties which permit their use in the preparation of pastes, such as, uniform grain size in the range of about 1–60μ, K-values according to Fikentscher (Cellulosechemie 13, 60, 1932) of 60–80, moderate capability of gelation at normal temperature with respect to the agents used in formation of the pastes, such as, high boiling esters.

The quantity of the vinyl chloride polymer in the total mixture depends upon the desired purpose. It can amount to 20–70% by weight. In such range the pasty mixture does not lose its processing properties nor do the coatings produced therefrom lose such important properties as hardness, elasticity and adhesiveness.

Many variations are possible with regard to the epoxides, the esters of which with self drying fatty acids are employed in admixture with the vinyl chloride polymers. Epoxides of hydrocarbons, esters, alcohols, ethers, amides, ketones and acetals come into consideration. Poly epoxides having a molecular weight below 2000 which are liquid at room temperature or on warming are preferred.

The following groups are illustrative of the epoxides which can be employed according to the invention:

Epoxides of unsaturated hydrocarbons, such as, limonenes, vinylcyclohexene, dicyclopentadiene, bicycloheptadiene, 1,4,5,8-dimethenohexahydronaphthalene and dodecene.

Epoxides of symmetrical and unsymmetrical ethers of unsaturated alcohols, such as, allyl alcohol, crotyl alcohol, 2-ethylhexenol, cyclohexenol, methyl cyclohexenecarbinol, dehydronorborneol, tricyclo-[5,2,1,0$^{2,6}$]-dec-3-en-9-ol (see Anselm application, S.N. 116,290, filed June 12, 1961, now abandoned).

Epoxides of ethers of unsaturated alcohols with polyhydric saturated alcohols or phenols, such as, the glycidyl ether of glycerol, pentaerythritol, carbohydrates and polyphenols.

Epoxides of esters of unsaturated alcohols with unsaturated monocarboxylic acids, such as, oleic acid, linoleic acid, the acids of soya bean oil and tall oil, 2-ethyl hexenoic acid and methyl cyclohexene carboxylic acid.

Epoxides of neutral esters of unsaturated alcohols with saturated or unsaturated poly carboxylic acids, such as, succinic acid, methyl glutaric acid, adipic acid, phthalic acid, cyanuric acid, fumaric acid, maleic acid, dodecenyl succinic acid, tetrahydrophthalic acid and dimeric unsaturated fatty acids.

Epoxides of esters of saturated polyhydric alcohols with unsaturated fatty acids, such as, for example, epoxidized soya bean oil, linseed oil and tall oil.

Epoxides of unsaturated alcohols, such as, crotyl alcohol, butene-2-diol-1,4, cyclohexene carbinol, oleyl alcohol and tricyclo-[5,2,1,0$^{2,6}$]-dec-3-en-9-ol.

Epoxides of unsaturated acid amides, such as, oleic acid amide.

Epoxides of unsaturated ketones, such as, phorone, isophorone, cyclopentadienone.

Epoxidized acetals of unsaturated alcohols, such as, of the formal of tricyclo-[5,2,1,0$^{2,6}$]-dec-3-en-9-ol.

The esters employed according to the invention preferably are prepared by esterification of epoxides of the types indicated with self drying fatty acids. The esterification can be carried out according to known methods, for example, by heating with the unsaturated fatty acid in the presence of catalysts until they have been practically completely used up. Poly unsaturated fatty acids, preferably those having conjugated double bonds, such as, for example, contained in linseed oil, tall oil, tung oil, soya bean oil and dehydrated castor oil, are employed for esterification of the epoxides. In addition to these carboxylic acids which can harden by autoxidation, their dimers, as well as non-hardening carboxylic acids, such as, for example, abietic acid, can also be used.

The quantities of the epoxide and of the self-drying fatty acid employed in the esterification depend upon the properties desired in the coatings to be produced. For example, their hardness and elasticity may be varied considerably thereby. Furthermore, the properties of the coatings produced also depend upon the equivalent weights of both and upon the reactivity of the epoxide groups. In general, 0.15 to 1.00 equivalent of the carboxylic acid is employed per 16 grams of oxirane oxygen, so that theroretically 0–85% of the epoxy groups remain unesterified. A portion of the epoxy groups are consumed in an etherification reaction occurring along with the esterification. Nevertheless, the epoxide esters produced still contain a residual content of epoxy groups which can easily be analytically determined. These residual epoxy groups are of significance for the compatability of the epoxide esters with the vinyl chloride polymers, for the later hardening and for effecting an increase in molecule size, if necessary in the presence of catalysts, which may be desired before preparation of the pastes. The epoxide esters produced also contain OH groups which are of significance for the adhesiveness and curing properties of the coatings produced according to the invention.

An increase in molecular size may be desired before preparation of the paste when the esters possess a low viscosity. Such increase in molecular size can be carried out by known controlled procedures which do not cause gelation. This measure improves the subsequent curing of the coatings so that thicker coatings can be produced. The addition of 0.5–5.0% by weight of a catalyst which is active at normal or moderately raised temperatures, such as, for example, a boron fluoride etherate, is suited for this purpose.

A further possibility for controlled increase in molecular size of the ester is in the treatment thereof with air or oxygen in the presence of a siccative. Expediently, this measure is carried out at raised temperatures in connection with the esterification. It is accompanied by considerable take up of oxygen by the unsaturated fatty acid component. In this case also the treatment must be controlled so that it does not lead to gelation of the epoxide ester. This is best accomplished by checking weight increase or measuring the volume of oxygen taken up. Such preoxidation of the epoxide ester was found to facilitate the later oxidative curing of the coating and that an increase in film thickness from about $25\mu$ to $50\mu$ in one application is rendered possible thereby.

Curing or hardening catalysts can, if desired, be added to the pasty mixtures according to the invention to facilitate the cross-linking of the epoxide esters over the epoxide and OH groups still present therein at temperatures within the range of gelation temperatures of the vinyl chloride polymers, that is, between 80–250° C., preferably between 160 and 200° C. The catalysts concerned are the so-called latent hardeners which only act upon the epoxide groups at elevated temperatures. Compounds within this category, for example, are: alcoholates, for instance of Al and Ti, complexes of metallorganic compounds or Lewis acids, for instnce of $BF_3$. Such latent hardeners can be added in quantities of 0.5 to 5% by weight of the total mixture. Furthermore, siccatives can be added to the pasty mixtures according to the invention. These facilitate the attack of the oxygen on the conjugated double bonds of the acid component of the esters. The radical reaction mechanism which occurs over peroxidic intermediate products simultaneously produces an increase in molecular size and cross-linking. Salts of Mn, Co, Pb, Zn or alcoholates of Al can be used as siccatives in quantities of 0.1 to 5% by weight of the total mixture, preferably, a 4-metal siccative consisting of metal naphthenates dissolved in ligroin. Such siccative contains 1.15% Co, 3.25% Pb, 3.25% Zn and 0.15% Mn.

If desired, the pastes according to the invention can have diluents and/or plasticizers added thereto to modify their viscosity. These simultaneously can be used for dissolving the hardeners and siccatives. The diluents and/or plasticizers which may amount to 5 to 50% of the paste should have no or only very slight gelling action on the vinyl chloride polymers at normal ambient temperatures. ylene, butylacetate and/or dioctylphthalate, for example, are suited. Advantageously, diluents or thinning agents which are built into the coating during its curing and thereby modify the properties of such coating may also be used. Examples, thereof, for instance, are epoxy soya bean oil, vinyl cyclohexene monoxide, pinene monoxide, dipentene diepoxide, the poly epoxides of the soya bean fatty acid ester of tricyclo-$[5,2,1,0^{2,6}]$-dec-3-en-9-ol, tetrahydrofurane and others.

The pasty mixtures according to the invention do not alter in their properties, especially with regard to viscosity and homogeneity and therefore their processing properties in painting, spraying, dipping and the like, during several weeks storage, especially, when in a closed container. After application of such mixtures as coatings, about $10\mu$–$50\mu$ thick, on metal surfaces and heating to 80–250° C., preferably, to 160–200° C., for 5 to 30 minutes firmly adherent coatings of great hardness and elasticity and with good resistances against organic media and water are obtained on unpretreated metal surfaces. They are particularly suited as primary coatings but also for enamel or covering lacquers of high gloss. Coloring agents or fillers can be admixed with the pastes to obtain special effects in the coatings produced.

The following examples will serve to illustrate a number of embodiments of the invention.

EXAMPLE 1a 488 g. of 3,4 - epoxy-tricyclo - $[5,2,1,0^{2,6}]$ - decanyl - 9-epoxy-allyl-ether (see Formula 3a in Table 1) having an oxirane content of 91% of the theoretical and corresponding to 2 mols of 100% substance were mixed with 286 g. (1 mol) of ricinoleic acid (acid No. 196, iodine No. 170, OH No. max. 2, conjugation of about 50%) and the mixture heated to 190–200° C. After 6 hours the acid number had dropped to 3.5 and the epoxide oxygen content of the resulting yellow oil which was viscous after cooling was 5.6% by weight. (The epoxide content determination was carried out by the pyridine/HCl method of Jungnickel et al., Org. Anal. I, 136, 1953.)

EXAMPLE 1b 50 parts by weight of the oily substance prepared in Example 1a were stirred together with 50 parts by weight of polyvinyl chloride of a K value of 70–73, grain size smaller than $10\mu$ and a specific weight of 1.38 (Vinnol P 100/70) to form a homogeneous paste. The viscosity of the paste at 20° C. was 288 poises. It remained practically unchanged over a period of weeks.

A uniform thin coating of the paste was applied to a sheet of unpretreated iron 0.5 mm. thick and then burned in with access to air at 190°C. for ¼ hour.

The resulting glossy coating, which was about $30\mu$ thick, was highly adherent (grid cut test according to Dr. J. Wilborn, "Physikal. u. Technolog. Prüfverfahren für Lacke und ihre Rohstoffe," Berliner Union, Stuttgart, 1953, page 984, gave a quality value of 1–2) and possessed good elasticity and impact toughness (Falling ball test according to Wolff-Zeidler in Wilborn, page 467, coating undamaged at 85 cm. height of fall) as well as good hardness (pencil hardness according to Wilborn, page 469, H7).

EXAMPLE 1c 35 parts by weight of the oily substance prepared as in Example 1a were mixed to a homogeneous paste with 15 parts by weight of dioctyl phthalate (DOP) and 50 parts of polyvinyl chloride (Vinnol P 100/70). The viscosity of the paste of 20° C. was 78 poises and such paste also remained practically unchanged over a period of weeks. A coating produced therefrom analogously to Example 1b exhibited a quality of 1–2 in the grid cut test and a pencil hardness of H6.

24 hours' exposure to butyl acetate at room temperature did not change these properties and only led to a 5% loss in weight. Exposure to 4% aqueous NaOH instead of the butyl acetate also did not effect any change in the properties of the coating (weight loss 1%). One hour's exposure to boiling water reduced the hardenss to H5 and a quality of 2 in the grid cut test (weight loss 1%).

The addition of 0.11 part by weight of the 4-metal siccative described above corresponding to 0.1 part by weight of total metal content to the paste was without any influence worth mentioning on the properties of the coatings produced.

EXAMPLE 1d

10–15% by weight of diisobutyl ketone or high boiling mineral spirits were mixed with a paste produced according to Example 1a. The resulting mixture was sprayed onto an iron sheet (20 x 20 cm.) with an ordinary spray pistol and the coating cured for ½ hour at 180° C. A clear uniform film 20–30µ thick was obtained. Discoloration only occurred after a further 25 minutes at 180° C. Embrittlement did not occur after 4 weeks. After one week's exposure to water the coating became milky and a 1–2% weight loss occurred.

EXAMPLE 1e 4 parts by weight of (tricyclo-[5,2,1,0$^{2,6}$]-dec-3-en-9-oxy)$_2$AlCl were dissolved in 35 parts by weight of the oily substance prepared as in Example 1a and such solution mixed with 15 parts by weight of DOP and 50 parts by weight of PVC to form a homogeneous paste. A coating produced from such paste analogously to Example 1b had a quality of 2 in the grid test and a pencil hardness of H4.

EXAMPLE 1f

A paste was prepared as in Example 1e except that the (tricyclo-[5,2,1.0$^{2,6}$]-dec-3-en-9-oxy)$_2$AlCl catalyst was replaced by (i-butyl)$_3$Al.anisol. The coating produced therefrom had a pencil hardness of H3 and a quality of 2 in the grid cut test.

EXAMPLE 1g 35 parts by weight of the oily substance prepared according to Example 1a were mixed with 15 parts by weight of DOP and 50 parts by weight of a vinyl choride-vinyl acetate copolymer with a vinyl acetate copolymer with a vinyl acetate content=10%, K value= 65, chlorine content=49–50%, specific weight=1.36 (Vinnol P 10/65) to form a homogeneous paste.

A coating produced from such paste analogously to Example 1b except that it was burned in at 180° C. for ¼ hour and then at 190° C. for ¼ hour had a pencil hardness of H4 and a value of 1 in the grid cut test.

EXAMPLE 2a 324 g. of the formal of 3,4-epoxy-dicyclo-[5,2,1,0$^{2,6}$]-decan-9-ol with an oxiranme content 88% of he theoretical corresponding to 0.835 mol of 100% substance was esterified as in Example 1a with 238.3 g. (0.035 mol) of ricinoleic acid with the addition of 1% by weight of tin-II-octoate. After 3 hours the acid number had dropped to 0.5 and the epoxy oxygen content amounted to 1.7% by weight (theoretical=2.6%).

EXAMPLE 2b 35 parts by weight of the ester prepared in Example 2a were mixed with 15 parts by weight of DOP, 5 parts by weight of butyl acetate and 50 parts by weight of PVC to form a homogeneous paste.

Coatings produced therewith analogously to Example 1b had a pencil hardness of H7 and a value of 1–2 in the grid cut test. Upon exposure to butylacetate, 4%

NaOH and boiling water as in Example 1c, respectively, caused a 9%, a 1% and no weight loss. Butyl acetate in addition to the weight loss only caused a decrease in hardness to H6. NaOH only caused the indicated weight loss whereas the boiling water caused a decrease in hardness to H3 and a value of 3 in the grid cut test.

EXAMPLES 3a–16a

Analogously to Example 1a esters were prepared from the starting materials indicated in Table 1, in part using tin-II-octotate as catalyst. Such table also gives data obtained on analysis of the esters produced. The average reaction temperature was 190° C. (180–200° C.).

The formulae of the individual epoxy compounds employed in the examples are identified ahead of the table.

*Epoxy compounds*

EXAMPLES 3a–7a

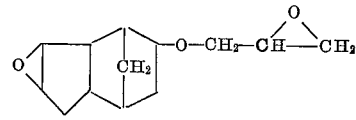

EXAMPLE 8a

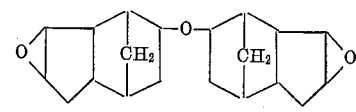

EXAMPLE 9a

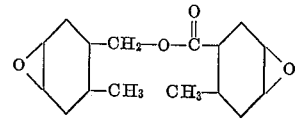

EXAMPLE 10a

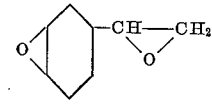

EXAMPLE 11a

EXAMPLE 12a

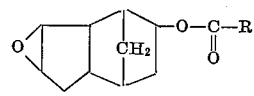

R=acyl radical of ricinoleic acid

EXAMPLE 13a

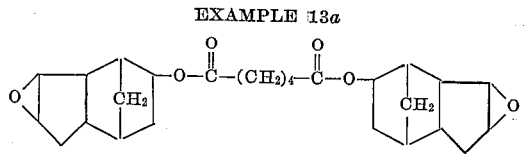

EXAMPLES 14a AND 15a

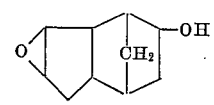

EXAMPLE 16a

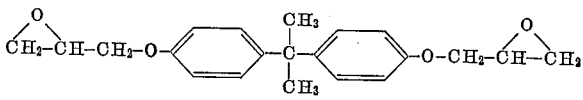

Table 1

| Ex. No. | Epox. Cmpd. Quantity (g.) | Epox. Cmpd. Purity (percent) | Fatty Acid Quantity | Fatty Acid Type | Catalyst (percent) | Time Hrs. | COOH/ | Acid No. |  (percent) | OH (percent) |
|---|---|---|---|---|---|---|---|---|---|---|
| 3a | 46 | 91 | 54 | R | | 11 | 0.5 | 2.4 | 2.2 | 2.6 |
| 4a | 36 | 91 | 64 | R | | 13 | 0.75 | 3.4 | 1.0 | 2.6 |
| 5a | 63 | 91 | 37 | S | 1.0 | 1 | 0.25 | 0.6 | 3.3 | |
| 6a | 45 | 96 | 55 | S | | 12 | 0.5 | 3.9 | 2.0 | |
| 7a | 45 | 91 | 27 / 28 | R / D | | 8.5 | 0.5 | 1.6 | 2.3 | |
| 8a | 56 | 84 | 44 | R | | 7 | 0.5 | 3.4 | 2.7 | |
| 9a | 50 | 95 | 50 | R | | 2 | 0.5 | 0.4 | 3.6 | 3.6 |
| 10a | 33 | | 67 | R | | 9.5 | 0.5 | 1.6 | 1.0 | |
| 11a | 36 | | 64 | R | 1.0 | 7.5 | 0.5 | 3.0 | 0.8 | |
| 12a | 75 | | 25 | R | | 12 | 0.5 | 1.0 | 1.7 | 1.3 |
| 13a | 61 | | 39 | R | | *8 / 19 | 0.5 | 4.5 | 2.2 | |
| 14a | 54 | 100 | 46 | R | | 9 | 0.5 | 2.9 | 2.4 | |
| 15a | 37 | 100 | 63 | R | 1.0 | 4.5 | 1.0 | 1.0 | 4.7 | |
| 16a | 38 | | 62 | R | | 14 | 0.5 | 2.7 | 2.6 | |

R = ricinoleic acid (see 1a).
S = soya bean oil acid.
D = dimeric fatty acid (acid No. 185, iodine No. 92).
Catalyst: tin-II-octoate.
Time: * = reaction temperature 240° C.
OH: determination with Stearoylchloride (Bring and Kadlecek, Plaste and Kautschuk 5, 43, 1958).

COOH/ = ratio of carboxyl to oxirane groups in esterification mixture before reaction.

EXAMPLE 3b–16b, 3c–3g AND 9c

Pastes of the composition indicated in Table 2 below were prepared analogously to Example 1b with the esters of Examples 3a to 16a, PVC and various additives.

Coatings were produced from these pastes, after previous siccativing with the 4-metal siccative described above, which were 20–40μ thick (in the case of 4b, 60–80μ, and in the case of 6b, 50μ). The hardness and grid cut test values of such coatings are also given in Table 2.

Table 2

| Ex. No. | Ester Parts | Ester Type | PVC Parts | Catalyst Parts | Catalyst Type | Plasticizer and Diluents Parts | Plasticizer and Diluents Type | Burning in Time, hrs. | Burning in ° C. | Grid cut test value | Pencil Hardness H |
|---|---|---|---|---|---|---|---|---|---|---|---|
| 3b | 50 | 3a | 50 | | | | | ¼ | 190 | 1–2 | 9 |
| 3c | 50 | 3a | 50 | 1 | BF₃.Pip | 5 | Xylol | 1 | 160 | 2 | 5–6 |
| 3d | 50 | 3a | 50 | 2 | BF₃.Pip | 15 / 10 / 10 | Xylol / L6 / THF | 1 | 160 | 2 | 7 |
| 3e | 50 | 3a | 50 | 2 | BF₃.Pip | 10 / 5 | Butac / L6 | 1 | 160 | 1–2 | 5–6 |
| 3f | 35 | 3a | 50 | | | 15 | DOP | ¼ | 190 | 1 | 8–9 |
| 3g | 34 | 3a | 66 | 2 | BF₃.Pip | 5 / 10 | L6 / THF | 1 | 160 | 1 | 7 |
| 4b | 50 | 4a | 66 | 2 | BF₃.Pip | 10 | Butac | 1 | 160 | 1 | 7 |
| 5b | 35 | 5a | 66 | | | 15 | DOP | ½ | 190 | 1 | 5 |
| 6b | 50 | 6a | 66 | 2 | BF₃.Pip | 5 | Butac | 1 | 160 | 1 | 5 |
| 7b | 50 | 7a | 66 | 2 | BF₃.Pip | 10 | Butac | 1 | 160 | 1 | 5–6 |
| 8b | 50 | 8a | 66 | 2 | BF₃.Pip | 5 / 10 | Xylol / Epoxy soya bean oil. | 1 | 160 | 1–2 | 9 |
| 9b | 50 | 9a | 66 | 2 | BF₃.Pip | | | 1 | 160 | 1 | 7 |
| 9c | 50 | 9a | 70 | | | 20 | DOP | ¼ | 190 | 1 | 8–9 |
| 10b | 50 | 10a | 50 | 2 | BF₃.Pip | 5 | Benzol | 1 | 160 | 2 | 7 |
| 11b | 35 | 11a | 50 | | | 15 | DOP | ¼ | 190 | 1–2 | 6–7 |
| 12b | 50 | 12a | 50 | 2 | BF₃.Pip | | | 1 | 160 | 1 | 8–9 |
| 13b | 35 | 13a | 50 | | | 15 | DOP | ¼ | 190 | 2 | HB |
| 14b | 50 | 14a | 50 | | | | | ¼ | 190 | 1–2 | 4 |
| 15b | 35 | 15a | 50 | | | 15 | DOP | ¼ | 190 | 1 | 4 |
| 16b | 35 | 16a | 50 | | | 15 / 5 | DOP / Butac | ¼ | 190 | 1 | 2 |

BF₃.Pip.: (BF₃.Piperidine)₂, M.P., 70° C.

L6 = 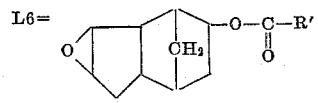

(R′ = radical of epoxy soya bean oil acid.)
THF = Tetrahydrofurane.
DOP = Dioctylphthalate.
Butac. = Butylacetate.

In Example 3d the coating was obtained by dipping the metal sheets. The coatings withstood the falling ball test from a height of 85 cm. (metal sheets 0.5–1.0 mm. thick).

The following Table 3 gives the properties of various of the coatings according to Table 2 after 20 hours' exposure to 4% aqueous NaOH at room temperature:

*Table 3*

| Ex. No. | Pencil Hardness | Grid cut test value | Weight loss (Percent) |
|---|---|---|---|
| 3f | H7–8 | 1–2 | 3 |
| 5b | H5 | 1–2 | 6 |
| 9c | H7–8 | 2 | 1 |
| 11b | H4 | 1–2 | 2 |
| 13b | HB | 2 | |
| 14b | H3 | 2–3 | 0 |
| 15b | H3 | 2 | 1 |

EXAMPLE 17a 50 g. of the ester of 3a (Table 1) were dissolved in 33 g. butyl acetate or xylene and 0.07 g. of the 4-metal siccative described above added thereto. The mixture was shaken with oxygen at 80° C. The oxygen absorption ceased after 5 hours. The resulting solution which was easily brushable contained 60% of preoxidized ester. Its epoxide content was 2.1% and the OH content was 4.2% and the acid number 3.

EXAMPLE 17b 71 parts by weight of the solution prepared according to Example 17a (corresponding to 50 parts by weight of nonvolatiles) were used to dissolve 2 parts by weight of $BF_3$.piperidine. Then 50 parts by weight of PVC were added and the mixture stirred to form a homogeneous paste. This paste was employed directly without further additions to coat iron sheets. The coatings were first dried for ½ hour at room temperature and then burned in at 160° C. for 1 hour. Even with coating thicknesses up to 70μ coatings were obtained which were still glossy and pore free and possessed good hardness, elasticity and bonding properties (pencil hardness=H8–9, grid cut test value=2, falling ball test height=83 cm. at metal sheet thickness of 0.5 mm.).

We claim:

A coating composition comprising a pasty mixture of a polymer selected from the group consisting of vinyl chloride homopolymers and vinyl chloride-vinyl acetate copolymers containing up to 50% vinyl acetate component, said polymer having a uniform grain size in the range of about 1–60μ, and an ester of a self drying fatty acid prepared by esterification of 0.15–1.00 equivalent of self drying fatty acid with 1 equivalent of a liquid polyepoxide, said polymer constituting 20 to 70% by weight of the polymer-ester mixture.

References Cited by the Examiner

UNITED STATES PATENTS

| | | | |
|---|---|---|---|
| 2,479,410 | 8/1949 | Rothrock et al. | 260—23 |
| 2,512,726 | 6/1950 | Penn et al. | 260—23 |
| 2,615,007 | 10/1952 | Greenlee | 260—18 |
| 2,627,471 | 2/1953 | Dowd | 260—18 |
| 2,826,562 | 3/1958 | Shokal | 260—23 |
| 2,909,537 | 10/1959 | Chatfield | 260—18 |
| 2,926,153 | 2/1960 | Christenson | 260—23 |
| 3,010,976 | 11/1961 | Greenspan et al. | 260—23.7 |
| 3,014,882 | 12/1961 | Bruin et al. | 260—23 |
| 3,055,778 | 9/1962 | Rhodes | 260—23 |
| 3,091,597 | 5/1963 | Henriques | 260—23 |
| 3,126,298 | 3/1964 | Patrick et al. | 260—18 |

OTHER REFERENCES

Kirk et al.: Encyclopedia of Chemical Technology (1955), vol. 14, page 731.

LEON J. BERCOVITZ, *Primary Examiner.*

JAMES A. SEIDLECK, *Examiner.*

M. FOELAK, R. A. WHITE, *Assistant Examiners.*